June 26, 1934.  J. F. FORD  1,964,347
WINDMILL
Original Filed April 13, 1931  2 Sheets-Sheet 1
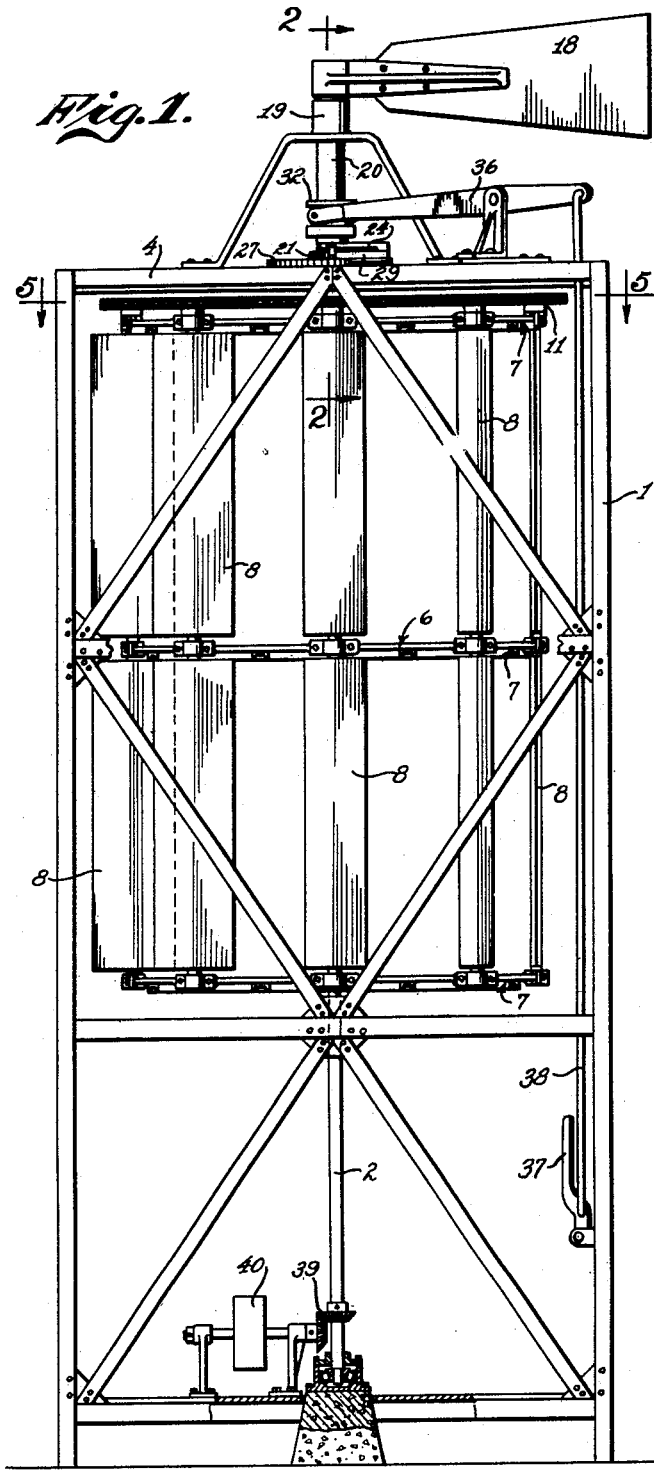
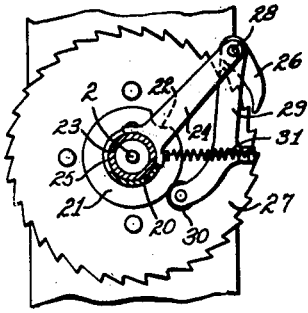
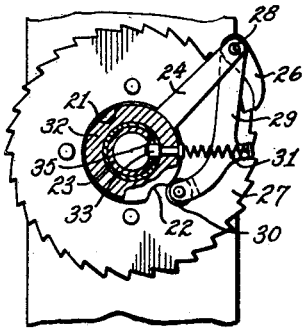
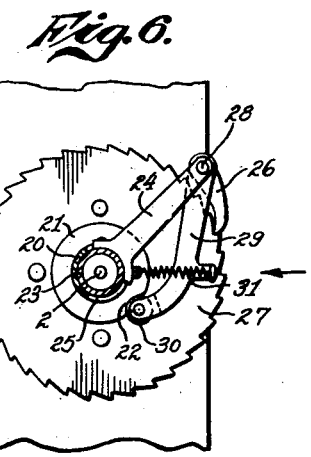
Inventor
John F. Ford;
By Lyon+Lyon
Attorneys June 26, 1934.　　　　　J. F. FORD　　　　　1,964,347
WINDMILL
Original Filed April 13, 1931　　2 Sheets-Sheet 2
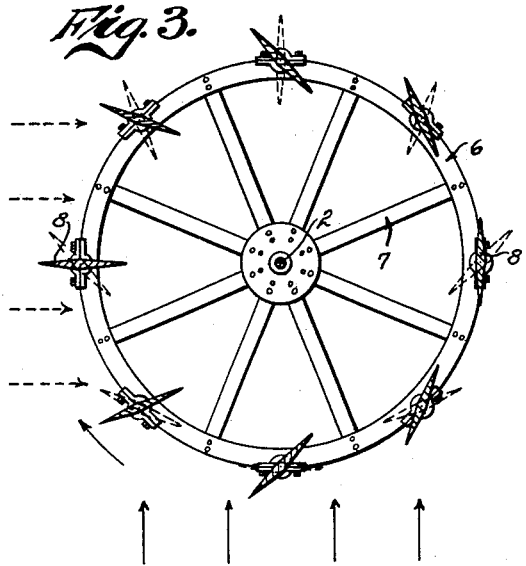
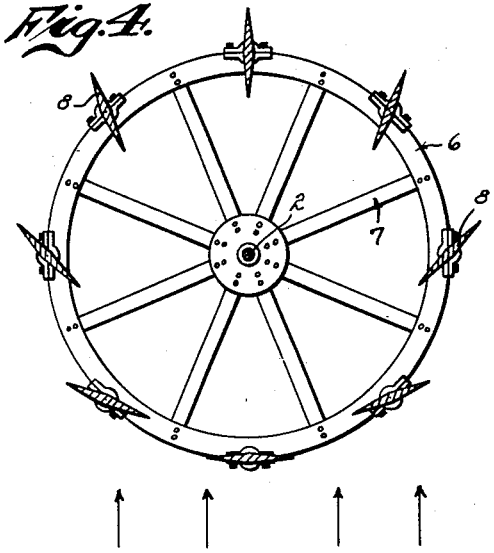
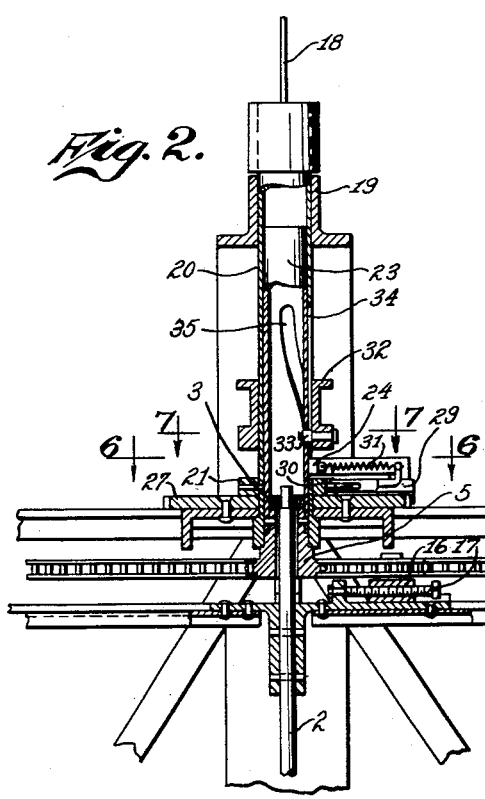
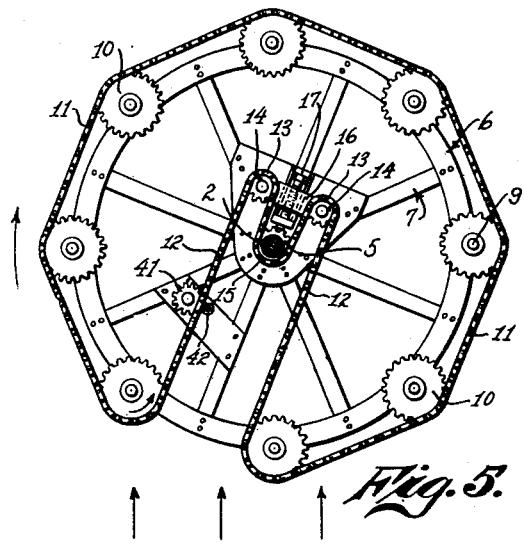
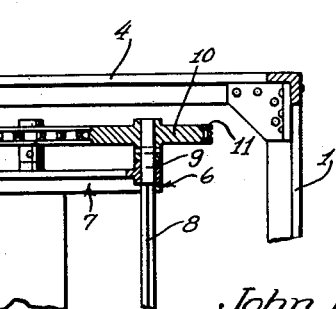
Inventor
John F. Ford;
By Lyon & Lyon
Attorneys Patented June 26, 1934

1,964,347

UNITED STATES PATENT OFFICE 1,964,347

WINDMILL

John F. Ford, Baldwin Park, Calif., assignor to Cecilia Ford McKinley, Los Angeles, Calif.

Application April 13, 1931, Serial No. 529,555
Renewed November 11, 1933

10 Claims. (Cl. 170—25)

My invention relates to windmills and particularly to that type of windmill having a plurality of blades mounted on a rotary frame and which are controlled automatically as the frame rotates to enable the blades to feather, that is, to hold their edges to the wind as they move forwardly, and their flat sides to the wind as they move away from the wind. In this connection, it should be understood that in this type of windmill the wind-wheel or rotary frame rotates on a substantially vertical axis. The general object of this invention is to provide a windmill of this type in which the vanes are provided with feathering means which is controlled by means of a direction vane that assumes a position corresponding to the direction of the wind; also to provide a simple means for effecting the feathering of the blades without having to resort to eccentrics or similar means which will offer a great resistance in the rotation of the windmill.

A further object of the invention is to provide simple means for stopping the windmill at will.

In its general construction, the embodiment of the invention includes an endless chain, the principal portion of which passes around the periphery of a rotary frame and engages sprocket wheels carried by the vanes, and this chain is disposed in a loop passing in, to a point near the axis of rotation of the rotary frame or wheel at which point the chain passes around a relatively fixed sprocket wheel. The position of this sprocket wheel is determined by the direction of the wind and furthermore the position of this sprocket determines the feathering position of the vanes so that when the wind is blowing in a certain direction the wind vane will hold this sprocket in a position such that as the wind-wheel rotates, the vanes will come toward the wind with their edges presented to it and go away from the wind with their flat sides presented to the wind. In this way, the maximum efficiency of the windmill is obtained and furthermore the position of each blade on the leeward side of the wheel is such that the wind exerts an impulse upon it tending to rotate the wheel in the same direction as the impulse of the wind exerted on a blade on the windward side of the wheel. In this way, the wind in passing out of the wheel exerts a rotating effect on the wheel as well as the wind passing into the wheel.

In using a central and relatively fixed sprocket wheel such as referred to it is evident that some means must be provided for preventing rotation of this sprocket or otherwise it would simply rotate with the wind-wheel and exert no feathering effect on the blades. One of the objects of this invention is to provide improved means for enabling this relatively fixed sprocket wheel to react properly to the rotation of the wheel, that is to say, to react as though it were absolutely fixed and at the same time enabling the sprocket wheel to rotate freely on its own axis so it may be controlled by the wind vane that changes its own direction with the direction of the wind.

Further objects of the invention will appear hereinafter.

The invention consists of novel parts and combinations of parts to be described hereinafter, all of which contribute to produce an efficient windmill.

A preferred embodiment of the invention is described in the following specification, while the broad scope of the invention is pointed out in the appended claims.

In the drawings:

Figure 1 is a side elevation of a windmill embodying my invention;

Figure 2 is a vertical section taken through the upper portion of the windmill, certain parts being broken away and particularly illustrating a means for enabling the direction vane of the mill to control the position of the relatively fixed sprocket wheel;

Figure 3 is a horizontal cross section through the wind wheel or rotary frame and particularly illustrating the way in which the blades feather to correspond with a certain wind direction. This view illustrates the feathering of blades for the direction of wind indicated by the arrows at the top of the figure and indicates the corresponding direction of rotation for the wind-wheel. In dotted lines in Figure 3 is indicated the manner in which the blades will feather for the direction of wind indicated by the dotted arrows at the right of the figure;

Figure 4 is a view similar to Figure 3, but indicating the positions the blades will have when the windmill has been controlled by hand to stop it and reduces the rotative effect of the wind on the wheel to a minimum;

Figure 5 is a horizontal section taken on the line 5, 5 of Figure 1 illustrating the arrangement of the sprocket wheels for the vanes and a means for mounting and controlling the driving chain that rotates the vanes on their axes as the wheel rotates;

Figure 6 is a horizontal section taken on the line 6, 6 of Figure 2 and certain parts being broken away; this view illustrates the reaction mechanism which enables the relatively fixed sprocket wheel to react and hold itself fixed while the wheel is rotating and yet be controlled in its own oriented position by the wind vane. This view shows these parts in their normal relation when the windmill is in operation;

Figure 7 is a view similar to Figure 6, but showing the parts in the relation which they have when the wind vane is moved by the wind in a direction to rotate the relatively fixed sprocket wheel in a direction which would naturally be prevented by the reaction device; and Figure 7a is a view similar to Figures 6 and 7, but showing the relation of the parts when the hand operated means is actuated to stop the windmill.

Before proceeding to a detailed description of the invention, it should be stated that it is intended to provide an efficient windmill which can be readily employed in more or less arid country where water occurs at considerable depth but which can be pumped to the surface of the earth if an economical power is at hand. A common type of windmill has been employed in which there are radial blades set in an inclined position and rotating in a vertical plane. Wind-wheels of this kind have been used on relatively high frames, but when in use the thrust of the wind against the wheel is very considerable and necessitates the use of an expensive derrick structure to withstand the wind. Furthermore, it has been found necessary to mount wheels of that type at a considerable distance above the earth thereby necessitating the use of long pump rods above the earth surface and developing the power in a reciprocating rod attached to the rod of the pump.

The windmill which forms the subject of this invention operates on a different principle and rotates on an axis which is transverse to the wind direction, and preferably in a vertical position, and the power is developed in a vertical rotary shaft which can be used to drive a pump of any kind.

Referring more particularly to the parts, 1 represents a frame which may be built up of angle iron as indicated and providing means for supporting a central shaft 2, the upper end of which rotates in a bearing 3 at the upper head or upper spider 4 of the frame 1 (see Figure 2). Mounted on this central shaft 2, but independently rotatable thereon, I provide a relatively fixed sprocket wheel 5 (see Figure 5) and on the central shaft 2 the rotary frame or wheel 6 is mounted, said wheel consisting of three spiders 7 carrying bearings for blades 8. At the upper ends of the blades 8 the trunnion 9 of each blade is extended upwardly above the bearing and carries a rigid sprocket wheel 10 and these sprocket wheels mesh with an endless chain 11 which passes around the periphery of the wind-wheel engaging the outer sides of the sprocket wheels 10. At one point on the wheel the chain presents two runs 12 that extend inwardly and form two loops 13 disposed around two guide sprocket wheels 14 which constitute a pair of guide sprockets and are disposed opposite to each other (see Figure 5). Between the loops 13, the chain is formed into a central loop 15 that extends between the runs 12 of the chain and this loop passes around sprocket wheel 5.

With this organization of parts, it will be evident that if the sprocket wheel 5 is held fixed and the wind-wheel is rotated in the clockwise direction (see Figure 5), the chain will cause a rotation of the blades 8 on their own axes as the wheel rotates. I utilize this rotation of blades to feather them in the manner indicated in Figures 3 and 4, for example, assuming that the wind direction is that indicated by the vertical full arrows in Figure 3 the blades will present themselves to the wind as indicated in full lines in this view, and as the blades move away from the windward side of the wheel they will present their flat sides squarely to the wind. As the blades come forward on the other side of the wheel they will maintain their edges toward the wind so that the wind will exert an effective rotative effort on the wheel.

In order to provide for taking up the slack in the chain, I prefer to mount the guide sprockets 14 on a carriage 16 which may be adjusted in or out toward the sprocket wheel 5 by means of an adjusting screw 17.

I provide means for controlling the oriented position of the sprocket wheel 5 through the agency of a wind vane 18 (see Figures 1 and 2), and in addition to this, I provide a reaction device which cooperates with the sprocket wheel 5 and the wind vane so that although the wind vane can control the position of the sprocket wheel, for all intents and purposes the sprocket wheel 5 reacts to the chain as though it were a fixed sprocket wheel.

In order to accomplish this in the embodiment of the invention illustrated in Figure 1, I mount the wind vane 18 to rotate freely in a bearing bracket 19, the blade of the vane being secured to a tubular spindle 20 that extends downward in axial alignment with the shaft 2. This spindle 20 is mounted for free rotation in the spider 4 in the vicinity of the bearing 3 and it carries rigidly a cam 21 in the form of a collar having a cam notch 22 at one point in its periphery. Within the tubular spindle 20, I provide a second tubular spindle 23 which carries a rigid pawl carrier 24 in the form of an arm which extends out through a circumferential slot 25 formed in the spindle 20 (see Figure 6). This pawl carrier 24 carries pivotally at its outer end a pawl 26 which normally engages ratchet teeth of a ratchet wheel 27, said ratchet wheel 27 being rigidly mounted on the spider 4.

The pivot pin 28 of the pawl 26 is rigid with a cam arm 29 carrying a roller 30 normally lying in the cam slot 22.

By reason of the fact that the arm 24 is rigid with the inner spindle 23 which is rigid with the sprocket wheel 5, it is evident that the pawl 26 will normally prevent rotation of the sprocket wheel 5 in a direction in which it would be rotated by the chain 11 if it rotated as a fixed part with the wind-wheel. In this connection, it should be noted that a coil spring 31 is provided attached to the cam arm 29 for holding the roller 30 against the side of the cam collar 21. In this way, the sleeves 20 and 23 are yieldingly latched together.

This construction illustrated in Figure 6, therefore, constitutes a reaction device which holds the sprocket wheel 5 as though it were relatively fixed as regards its reactions to the chain 11. Nevertheless, this pawl 26 will not interfere with the movement of the wind vane 18 in a clockwise direction for the reason that a movement of the vane in this direction will rotate the cam collar 21 in the direction indicated in Figure 7 relative to the pawl carrier 24 and this will lift the pawl 26 off the ratchet wheel as indicated, thereby permitting free rotation of the vane in this direction by the wind. This unlatching movement of course, involves a relative movement of tubular spindles 20 and 23, which is permitted by providing slight lateral play at the roller 33. This roller does not completely fill the helical slot 35, see Fig. 7.

If the wind tends to rotate the vane in the other direction, the pawl will either be lifted away from the teeth by the cam notch 22, or else the pawl will just slip idly over the teeth of the ratchet wheel. In order to enable the relative oriented position of the sprocket wheel 5 to be changed at will to stop the wheel by having the feathering action thrown about 90° away from its position with respect to a given wind direction, I provide a sliding collar 32 mounted to slide vertically on the outer side of the tubular spindle 20 of the wind vane 18 and this collar is provided on its inner side with a pin or roller 33 that runs in a vertical slot 34 in the tubular spindle 20. This pin or roller 33 is received in a helical slot 35 formed in the tubular spindle 23 that is rigid with the sprocket wheel 5.

A lever 36 (see Figure 1) is provided on the upper end of frame 1 for engaging this collar 32 to slide it upwardly. In order to actuate the lever 36, a hand lever 37 may be provided near the ground, said lever being attached to a link 38 that is secured to the short arm of the lever 36. By pulling down on the lever 37, the collar 32 can be slid upwardly; when this occurs, the roller 33 will run up in the slot 35, and also in the slot 34 causing a rotation of the cam 21 relative to the arm 24 in an anti-clockwise direction (see Figure 7a). This will cause the cam notch 22 to throw the lever 29 out of the notch and disconnect the pawl 26 from the ratchet wheel. There will then be no means to hold the central sprocket wheel 5 against rotation and the wheel will come to a stop. If friction tended to prevent the sprocket wheel 5 from rotating nevertheless it would simply feather the blades in the manner indicated in Figure 4 which would not enable them to cooperate with the prevailing direction of wind to rotate the wheel.

The lower end of the shaft 2 will drive bevel gearing 39 through which a belt pulley 40 may be driven.

The slack run of the chain 11 may be provided with a guide sprocket wheel 41 cooperating with a guide roller 42 to prevent the chain from getting a kink in it.

It is understood that the embodiment of the invention described herein is only one of the embodiments this invention may take, and I do not wish to be limited in the practice of the invention, nor in the claims, to the particular embodiment set forth.

What I claim is:—

1. In a windmill, the combination of a fixed frame, a rotary frame supported on the fixed frame to rotate on an axis transverse to the direction of movement of the wind, a plurality of blades carried by the rotary frame, means for supporting the blades on the rotary frame for rotation on axes parallel with its own axis of rotation, sprocket wheels rigid with the blades, a relatively fixed sprocket wheel, an endless sprocket chain all parts of which are located in the same plane, said chain engaging the first named sprocket wheels and passing around the said fixed sprocket wheel, and a pair of sprocket wheels mounted on the rotary frame and cooperating with the fixed sprocket wheel to guide the chain in open loops located respectively on opposite sides of the fixed sprocket wheel, and in an open reversed loop around the fixed sprocket wheel, said chain and sprocket wheels cooperating to feather the blades as the rotary frame rotates.

2. In a windmill, the combination of a fixed frame, a rotary frame supported on the fixed frame to rotate on an axis transverse to the direction of movement of the wind, a plurality of blades carried by the rotary frame, means for supporting the blades on the rotary frame for rotation on axes parallel with its own axis of rotation, sprocket wheels rigid with the blades, a relatively fixed sprocket wheel, an endless sprocket chain all parts of which are located in the same plane, said chain engaging the first named sprocket wheels and passing around the said fixed sprocket wheel, a pair of sprocket wheels mounted on the rotary frame and cooperating with the other sprocket wheels to guide the chain in an open loop around each of the sprocket wheels of said pair of sprocket wheels, and in a reversed loop around the fixed sprocket wheel, whereby the chain does not cross itself at any point and means for mounting said pair of sprocket wheels for movement toward or away from the fixed sprocket wheel, said chain and sprocket wheels cooperating to feather the blades as the rotary frame rotates.

3. In a windmill, the combination of a fixed frame, a rotary frame supported on the fixed frame to rotate on an axis transverse to the direction of movement of the wind, a plurality of blades carried by the rotary frame, means for supporting the blades on the rotary frame for rotation on axes parallel with its own axis of rotation, sprocket wheels rigid with the blades, a relatively fixed sprocket wheel, a single endless uncrossed sprocket chain all parts of which are located in the same plane, said chain engaging the first named sprocket wheels located in a plane at right angles to the axis of rotation of the rotary frame and passing around the said fixed sprocket wheel, said chain and sprocket wheels cooperating to feather the blades as the rotary frame rotates, a direction vane having means for causing the same to assume a position corresponding to the direction of the wind, means connecting the vane with the relatively fixed sprocket wheel to hold the same in a position corresponding to the direction of the wind, and a reaction device for preventing the relatively fixed sprocket wheel from being rotated by the chain.

4. In a windmill, the combination of a fixed frame, a rotary frame supported on the fixed frame to rotate on an axis transverse to the direction of movement of the wind, a plurality of blades carried by the rotary frame, means for supporting the blades on the rotary frame for rotation on axes parallel with its own axis of rotation, sprocket wheels rigid with the blades, a relatively fixed sprocket wheel, a single endless uncrossed sprocket chain all parts of which are located in the same plane, said chain engaging the first named sprocket wheels, located in a plane at right angles to the axis of rotation of the rotary frame and passing around the said fixed sprocket wheel, said chain and sprocket wheels cooperating to feather the blades as the rotary frame rotates, and a ratchet device including a ratchet wheel fixed on the frame, associated with the relatively fixed sprocket wheel for preventing rotation of the same by the pull of the chain, and enabling the relatively fixed sprocket wheel to hold the chain and thereby cause rotation of the blade sprocket wheels while the rotary frame rotates.

5. In a windmill, the combination of a fixed frame, a rotary frame supported on the fixed frame to rotate on an axis transverse to the direction of movement of the wind, a plurality of blades carried by the rotary frame, means for supporting the blades on the rotary frame for rotation on axes parallel with its own axis of rotation, sprocket wheels rigid with the blades, a relatively fixed sprocket wheel, a single endless uncrossed sprocket chain all parts of which are located in the same plane, said chain engaging the first named sprocket wheels located in a plane at right angles to the axis of rotation of the rotary frame and passing around the said sprocket wheel, said chain and sprocket wheels cooperating to feather the blades as the rotary frame rotates, a ratchet device including a ratchet wheel fixed on the frame, associated with the relatively fixed sprocket wheel for preventing rotation of the same by the pull of the chain, and enabling the relatively fixed sprocket wheel to hold the chain and thereby cause rotation of the blade sprocket wheels while the rotary frame rotates, and means actuated by the vane to inhibit the ratchet device if the wind urges the vane to rotate in a direction which the ratchet device would prevent.

6. In a windmill, the combination of a fixed frame, a rotary frame supported on the fixed frame to rotate on an axis transverse to the direction of movement of the wind, a plurality of blades carried by the rotary frame, means for supporting the blades on the rotary frame for rotation on axes parallel with its own axis of rotation, sprocket wheels rigid with the blades, a relatively fixed sprocket wheel, a single endless uncrossed sprocket chain all parts of which are located in the same plane, said chain engaging the first named sprocket wheels, located in a plane at right angles to the axis of rotation of the rotary frame and passing around the said relatively fixed sprocket wheel, said chain and sprocket wheels cooperating to feather the blades as the rotary frame rotates, a ratchet device associated with the relatively fixed sprocket wheel for preventing rotation of the same and enabling the relatively fixed sprocket wheel to hold the chain and thereby cause rotation of the blade sprocket wheels while the rotary frame rotates, said ratchet device including a ratchet wheel fixed to the frame and a ratchet pawl carried by the relatively fixed sprocket wheel cooperating therewith, a cam rigid with the vane, said pawl having a rigid arm resting on the cam, for moving the pawl out of engagement with the ratchet wheel if the wind moves the vane in a direction that the ratchet wheel would prevent.

7. In a windmill, the combination of a fixed frame, a rotary frame supported on the fixed frame to rotate on an axis transverse to the direction of movement of the wind, a plurality of blades carried by the rotary frame, means for supporting the blades on the rotary frame for rotation on axes parallel with its own axis of rotation, sprocket wheels rigid with the blades, a relatively fixed sprocket wheel, an endless sprocket chain engaging the first named sprocket wheels and passing around the said fixed sprocket wheel, said chain and sprocket wheels cooperating to feather the blades as the rotary frame rotates, and hand operated means operative at will to change the relation of the chain with respect to the blades to cause the blades to alter the feathering effect and operating to hold the blades in a relation to prevent the wind from rotating the rotary frame.

8. In a windmill, the combination of a fixed frame, a rotary frame supported on the fixed frame to rotate on an axis transverse to the direction of movement of the wind, a plurality of blades carried by the rotary frame, means for supporting the blades on the rotary frame for rotation on axes parallel with its own axis of rotation, sprocket wheels rigid with the blades, a relatively fixed sprocket wheel, an endless sprocket chain engaging the first named sprocket wheels and passing around the said fixed sprocket wheel, said chain and sprocket wheels cooperating to feather the blades as the rotary frame rotates, means associated with the relatively fixed sprocket wheel for preventing rotation of the same and thereby enabling the relatively fixed sprocket wheel to hold the chain as the rotary frame rotates, and hand operated means operative at will to change the relation of the chain to the blade sprocket wheels to prevent the blades from feathering for a given wind direction and operating to hold the blades in a relation to prevent the wind from rotating the rotary frame.

9. In a windmill, the combination of a fixed frame, a wind vane mounted for rotation on a vertical axis, a rotary frame supported on the fixed frame to rotate on an axis transverse to the direction of movement of the wind, a plurality of blades carried by the rotary frame, means for supporting the blades on the rotary frame for rotation on axes parallel with its own axis of rotation, sprocket wheels rigid with the blades, a relatively fixed sprocket wheel, a single endless sprocket chain engaging the first named sprocket wheels and passing around the said fixed sprocket wheel, located in a plane at right angles to the axis of rotation of the rotary frame, said chain and sprocket wheels cooperating to feather the blades as the rotary frame rotates, a ratchet wheel mounted fixedly on the fixed frame, a pawl carrier rigid with respect to the relatively fixed sprocket wheel, a cam rigid with the vane so as to rotate therewith as the vane changes its direction with the wind, and hand operated means for causing relative rotation of the cam and the pawl carrier for feathering the blades in a manner to stop the rotation of the rotary frame, a pawl carried by the pawl carrier to cooperate with the ratchet wheel, and an arm rigid with the pawl resting on the cam, and cooperating with the cam to lift the pawl out of engagement with the fixed ratchet wheel for one direction of rotation of the vane.

10. In a windmill, the combination of a fixed frame, a rotary frame supported on the fixed frame to rotate on an axis transverse to the direction of movement of the wind, a plurality of blades carried by the rotary frame, means for supporting the blades on the rotary frame for rotation on axes parallel with its own axis of rotation, sprocket wheels rigid with the blades, a relatively fixed sprocket wheel, a single endless uncrossed sprocket chain all parts of which are located in the same plane, said chain engaging the first named sprocket wheels located in a plane at right angles to the axis of rotation of the rotary frame and passing around the said relatively fixed sprocket wheel, said chain and sprocket wheels cooperating to feather the blades as the rotary frame rotates, a fixed ratchet wheel secured to the frame, a ratchet pawl carried by the relatively fixed sprocket wheel cooperating with the fixed ratchet wheel, a wind vane supported for rotation on the fixed frame, a cam rigid with the vane, said pawl having a rigid arm resting on the cam for moving the pawl out of engagement with the ratchet wheel if the wind moves the vane in a direction that the fixed ratchet wheel would otherwise prevent.

JOHN F. FORD.